(12) United States Patent
Iganami

(10) Patent No.: US 6,625,218 B1
(45) Date of Patent: Sep. 23, 2003

(54) AUDIO/VIDEO SEPARATOR INCLUDING A USER DATA START ADDRESS REGISTER

(75) Inventor: Chiho Iganami, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 09/189,147

(22) Filed: Nov. 10, 1998

(30) Foreign Application Priority Data

Nov. 10, 1997 (JP) .............................................. 9-307289

(51) Int. Cl.$^7$ ................................................. H04N 7/12
(52) U.S. Cl. ................................................ 375/240.26
(58) Field of Search ....................... 375/240.01, 240.25, 375/240.26; 707/100; H04N 7/12

(56) References Cited

U.S. PATENT DOCUMENTS 5,813,010 A * 9/1998 Kurano et al. .............. 707/100

FOREIGN PATENT DOCUMENTS

JP  5-83239   4/1993
JP  8-163574  6/1996

* cited by examiner

Primary Examiner—Young Lee
(74) Attorney, Agent, or Firm—Foley & Lardner

(57) ABSTRACT

An MPEG decoder which prevents user data, which is in video code data of MPEG-compressed code data, from being overwritten by the next code data before a CPU reads the user data has an audio/video separator 3 and a memory. The audio/video separator 3 has a start code detector 11 which, in turn, has a start code start address register 12 and a start code register 13. When the MPEG decoder receives compressed code data, the start code detector 11 searches the compressed code data for a start code specified by the start code register 13 and stores the start address of the start code into the start code start address register 12.

18 Claims, 9 Drawing Sheets

AUDIO/VIDEO SEPARATOR INCLUDING A USER DATA START ADDRESS REGISTER

BACKGROUND OF THE INVENTION

1. Field of the Invention

The present invention relates to a decoder which decodes code data produced by compressing audio/video signals (A/V signals). In particular, the present invention relates to an MPEG decoder which detects and extracts MPEG-coded user data included in video code data.

2. Description of the Related Art

MPEG-compressed video data is processed during decoding in six hierarchical layers: sequence layer, GOP (Group Of Picture) layer, picture layer, slice layer, macro block layer, and block layer. User data, composed of a sequence header, one or more GOPs, and a sequence end code, is added to video data; it is added to video data as necessary in the sequence layer, GOP layer, and picture layer. User data may be used to add superimposed dialogs or scene-searching information to the video code. During decoding, the CPU reads user data to display superimposed dialogs or to search for a scene. In each layer, video data and user data begin with 4-byte code areas each containing a unique start code. During decoding, this start code is used to identify a data hierarchy and a user data area.

A conventional decoder for decoding audio/video compressed code data is shown in FIG. 9. The decoder 1 of FIG. 9 comprises a stream interface 2, an audio/video separator (hereafter called an A/V separator 3), a memory interface 4, an audio decoder 5, and a video decoder 6. The video decoder 6 has a start code detector 15 which, in turn, a user data start address register 16.

The stream interface 2 receives code data (DATA), and outputs data signals (DATA') to the A/V separator 3. The A/V separator 3 outputs two types of data signals, A_DATA and V_DATA, to the memory interface 4. The memory interface 4 outputs a data signal A_DATA' to the audio decoder 5, and a data signal V_DATA' to the video decoder 6. The audio decoder 5 outputs a data request signal A_REQ to the memory interface. The video decoder 6 outputs a data request signal V_REQ to the memory interface. The start code detector 15 outputs a user data detection signal SCD_DET to a CPU 9. The CPU 9 outputs an address signal REG_ADD and a read request signal REG_READ to the MPEG decoder 1, and the MPEG decoder 1 outputs a data signal OUT_DATA to the CPU 9. The following describes the operation.

Code data (DATA) that is input to the MPEG decoder 1 conforms to the MPEG standard. This data is composed of two types of data: compressed audio code data and compressed video code data. These two types of data, each with an appropriate length, are switched as necessary. Upon receiving this code data (DATA), the stream interface 2 synchronizes it with the internal clock signal and sends the data signal (DATA') to the A/V separator 3. The A/V separator 3 separates the data signal DATA' into two types of code data—audio code data and video code data—and outputs them to the memory interface 4 as two separate data signals, one as A_DATA and the other as V_DATA. The memory interface 4 stores in memory the audio code data (A_DATA) and the video code data (V_DATA ). When decoding, the audio decoder 5 sets the data request signals A_REQ high, and the video decoder 6 sets V_REQ high, as necessary (When these decoders do not request data, A_REQ and V_REQ remain low.) When A_REQ goes high, the memory interface 4 outputs the audio code data to the audio decoder 5 via the data signal line A_DATA'; when V_REQ goes high, the memory interface 4 outputs the video code data to the video decoder 6 via the data signal line V_DATA'.

The video decoder 6 causes the start code detector 15 to detect a start code contained in the video code data received via the data signal line V_DATA'. When the start code detector 15 detects the start code of data of a layer, the video decoder 6 performs decoding processing corresponding to that layer. When the video decoder 6 detects the start code of user data, the video decoder 6 stores the start byte address of the user data into the user data start address register 16 and sets the user data detection signal SCD_DET high (SCD_DET remains low when user data is not detected).

The CPU 9 reads data stored in the memory interface 4 via a register whose address is different from that of the user data start address register 16. When the CPU 9 reads data from the MPEG decoder 1, it sets the read request signal REG_READ low and specifies an address via the address signal REG_ADD. This allows data stored in each register to be read via the data signal line OUT_DATA (When the CPU 9 does not read data, REG_READ remains high.) When the user data detection flag SCD_DET is high, the CPU 9 reads the address from the user data start address register 16 and extracts user data, beginning with the address in the memory interface specified by the user data start address register 16, until the next start code is detected.

One of the problems with the conventional method is that the next code data is input into the memory interface 4 before the CPU 9 completes the extraction of user data from the MPEG decoder 1. This prevents the CPU 9 from extracting the user data correctly.

Code data is input to the MPEG decoder 1 independently of the memory data read operation executed by the CPU 9. That is, code data is written into memory interface 4 whenever there is a free memory area. When the video decoder 6 decodes code data, the decode operation executed by the video decoder 6 involves a decoding delay. Therefore, while the code data is decoded, the address used by the A/V separator 3 to write data into the memory interface 4 via V_DATA is also used, in most cases, by the video decoder 6 to read data from the memory interface 4. However, when the video decoder 6 decodes user data, no decoding delay is generated because the video decoder 6 does not decode the user data but skips it and keeps on reading code data from the memory interface 4 until the start code of the next video data to be decoded is detected. This generates a free area in the memory into which the next data is read before the CPU 9 reads the user data, sometimes preventing the CPU 9 from reading the user data correctly. That is, the above problem depends, to some extent, on the data read speed of the CPU 9; the problem is generated when the speed at which data is read by the CPU 9 via the data signal OUT_DATA is slower than the speed at which data (DATA) is input to the stream interface 2.

To avoid the above problem, the CPU must read user data more quickly. For the CPU to read data more quickly, it is necessary to reduce the cycle time between the time the MPEG decoder 1 detects that the CPU 9 sets the read request signal REG_READ low and the time data is output from memory to the data signal line OUT_DATA. This requires that the MPEG decoder 1 output data to CPU 9 more quickly or that the MPEG decoder 1 be re-designed to suit the data read speed of the CPU 9.

However, an increase in the speed at which data is output from the MPEG decoder 1 to the CPU 9 results in an increase in the LSI size, increasing the production cost. On the other hand, the need to prepare the MPEG decoder 1 specifically designed for the data read speed of the CPU 9 requires many types of MPEG decoders, increasing the development cost.

SUMMARY OF THE INVENTION

It is an object of the present invention to provide a decoding method and a decoder which allow the CPU to extract user data from the decoder at any data read speed of the CPU. To achieve the above object, A decoding method of the present invention for decoding audio/video compressed code data, said video code data containing a first code indicating a type of data, said decoding method comprising the steps of: (a) receiving the code data; (b) separating the code data into the audio code data and the video code data; (c) checking if the code data is the video code data; (d) executing processing according to said first code contained in the video code data; and (e) decoding the code data and outputting the decoded code data. MPEG decoding method according to the present invention is a decoding method for decoding MPEG-compressed code data, the code data composed of audio code data and video code data, the video code composed of hierarchical data and user data each preceded by a first start code, wherein a user data start address register is provided to store the start address of the user data, the decoding method comprising the steps of: (a) receiving the code data; (b) separating the code data into the audio code data and the video code data; (c) checking if the code data is the video code data; (d) if the code data is the video code data, if the code data is the video data, and if the user data is detected in the video data, storing an address of the start byte of the user data into the user data start address register and storing the address of a start byte of the user data into the user data start address register; and turning a signal on, the signal indicating that the user data was detected; and (e) decoding the code data and outputting the decoded code data.

According to the present invention, the CPU receives, before code data entered into the decoder is decoded, a user data detection signal indicating that the code data contains user data. Upon receiving this signal, the CPU turns on the read request signal, with the address of the user data start address register specified, to read the address from that register. The CPU then reads data, beginning at the address specified by the user data start address register, until the next start code is detected. In this way, the CPU extracts the user data.

The MPEG decoder according to the present invention allows the CPU to read user data from the MPEG decoder regardless of the speed at which the CPU reads data.

An A/V separator, included in the MPEG decoder according to the present invention, has a user data detector which, upon detection of user data in entered code data, immediately outputs the user data detection signal to the CPU, with no decoding delay introduced by a video decoder, so that the CPU can start extracting the user data immediately. Therefore, even when the CPU is slower than the speed at which code data is stored into the memory, the CPU can extract user data before the memory containing the user data is updated by the next code data. This means that the CPU can extract user data regardless of the speed at which the CPU reads the user data.

Thus, the present invention eliminates the need to consider the speed at which the CPU reads user data from the MPEG decoder and therefore eliminates the need to increase the speed at which data is output from the MPEG decoder to the CPU. This results in a smaller LSI or eliminates the need for the MPEG decoder to be specifically designed for the speed of the CPU, thus lowering the development cost.

DESCRIPTION OF THE PREFERRED EMBODIMENTS

Figure 1:
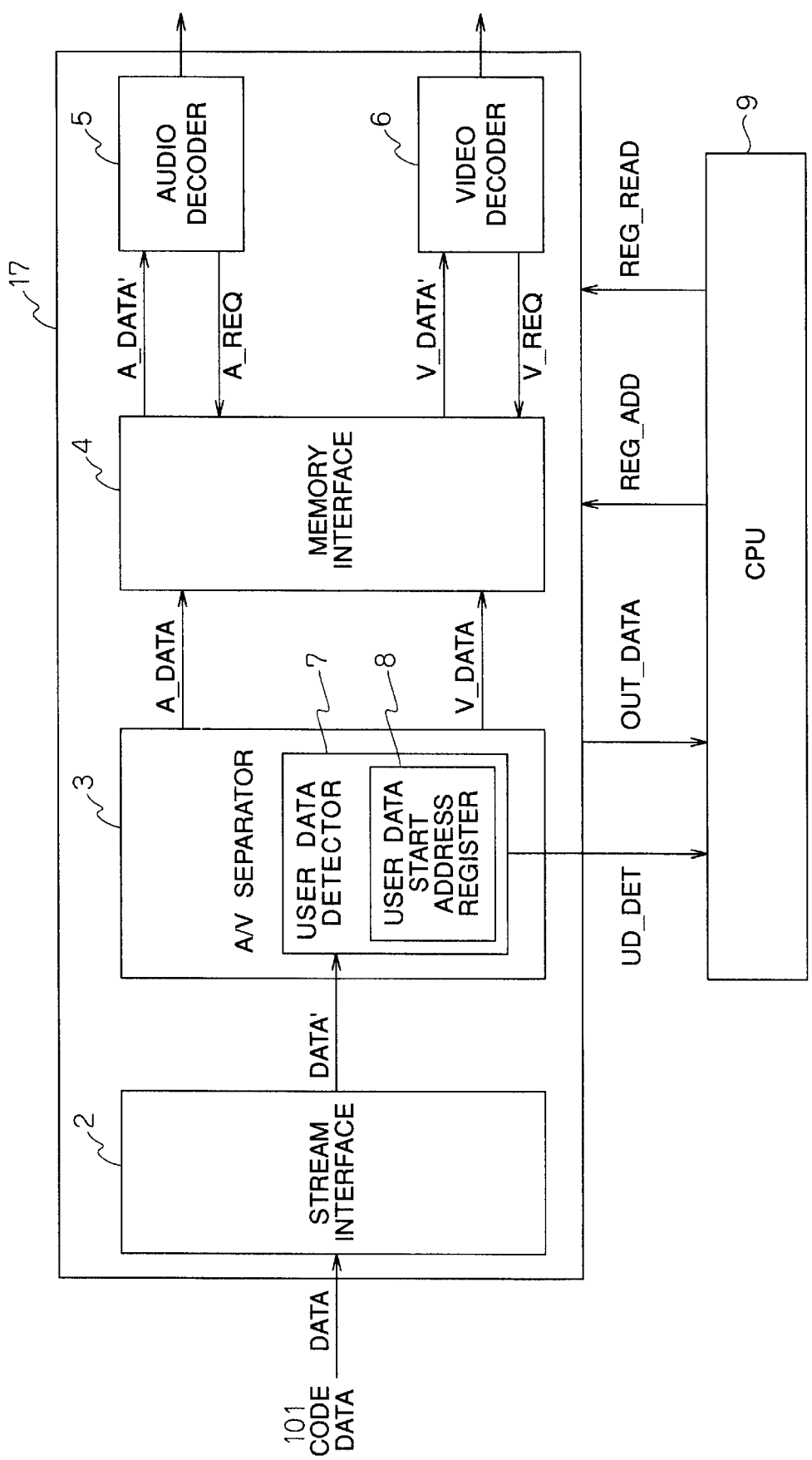
FIG. 1 is a block diagram showing the configuration of the first embodiment of the MPEG decoder of the present invention.
Figure 9:
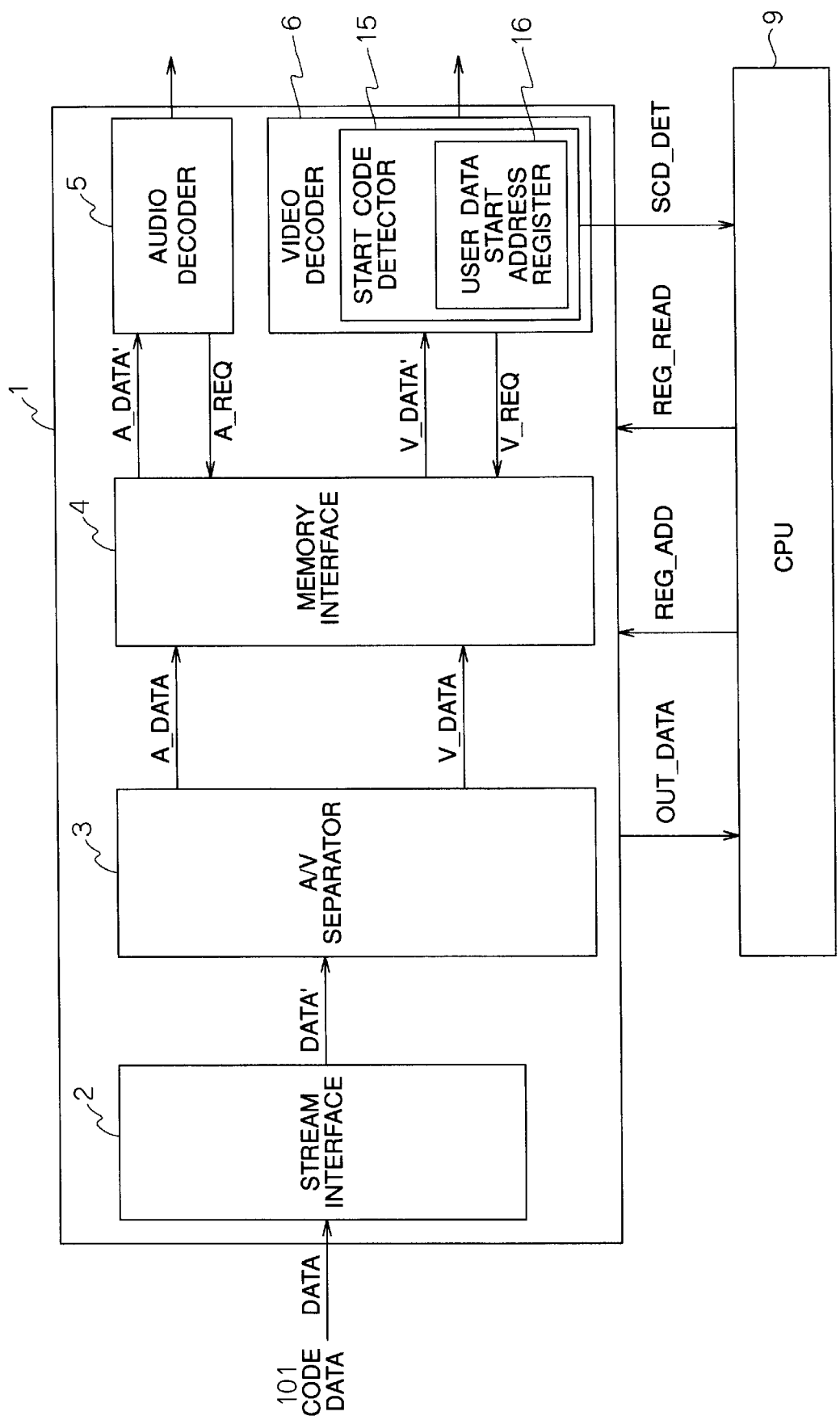
FIG. 9 is a block diagram of an example of a conventional MPEG decoder.

The first embodiment of the present invention will be described with reference to FIG. 1. The numbers of components in FIG. 1 corresponding to those in FIG. 9 are the same. In the figure, an MPEG decoder 17 has a stream interface 2, an A/V separator 3, a memory interface 4, an audio decoder 5, and a video decoder 6. The A/V separator 3 has a user data detector 7 which contains a user data start address register 8.

Figure 2:
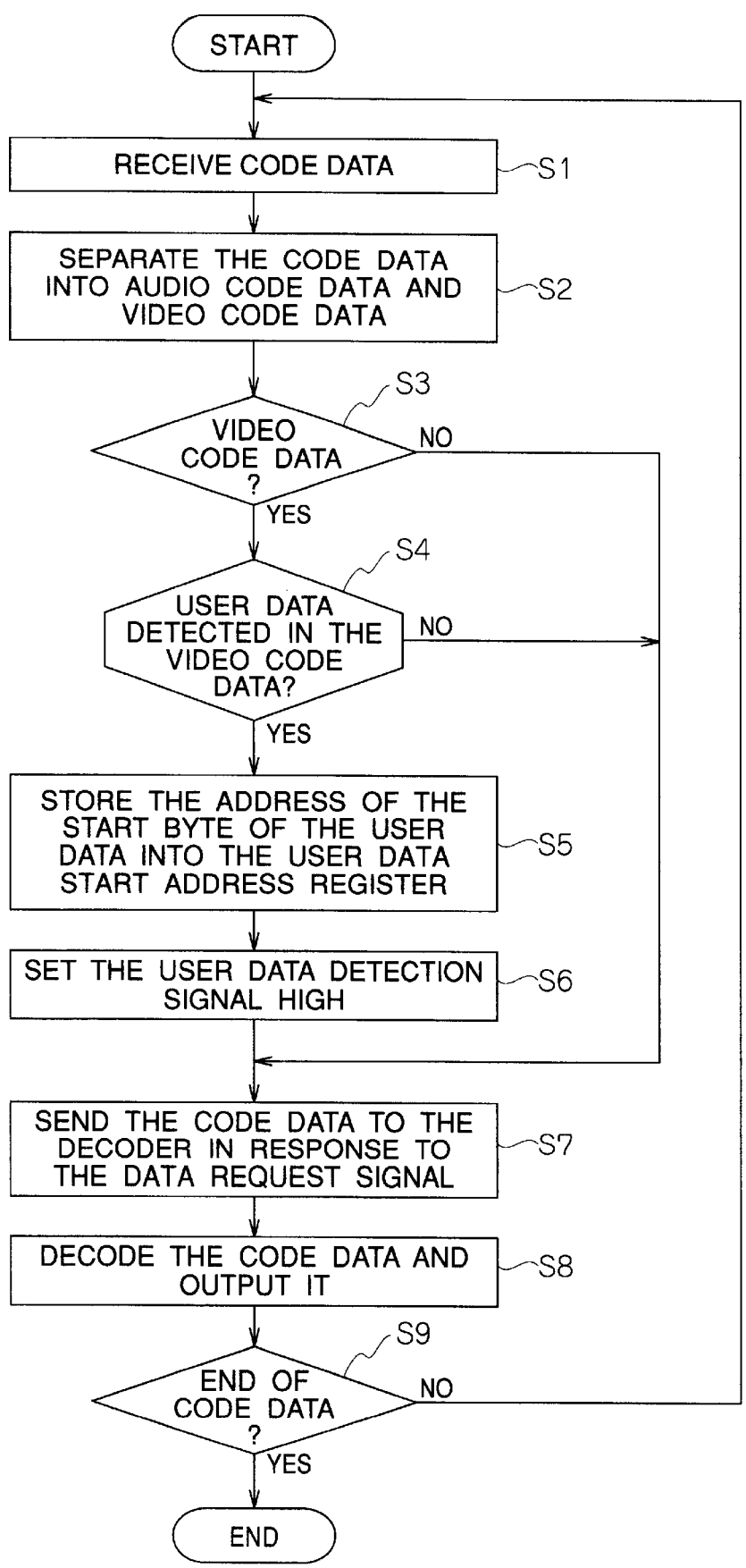
FIG. 2 is a flowchart showing the first embodiment of the MPEG decoder according to the present invention.

The stream interface 2 receives code data (DATA) and outputs data signals (DATA') to the A/V separator 3. The A/V separator 3 outputs two types of data signals, A_DATA and V_DATA, to the memory interface 4. The memory interface 4 outputs a data signal A_DATA' to the audio decoder 5, and a data signal V_DATA' to the video decoder 6. The audio decoder 5 outputs a data request signal A_REQ to the memory interface 4. The video decoder 6 outputs a data request signal V_REQ to the memory interface 4. The user data detector 7 outputs a user data detection signal UD_DET to the CPU 9. The CPU 9 outputs an address signal REG_ADD and a read request signal REG_READ to the MPEG decoder 17, and the MPEG decoder 17 outputs a data signal OUT_DATA to the CPU 9. The following describes the operation with reference to FIG. 2.

Code data (DATA) that is input to the MPEG decoder 17 conforms to the MPEG standard. This data is composed of two types of data: compressed audio code data and compressed video code data. These two types of data, each with an appropriate length, are switched as necessary. Upon receiving code data (DATA), the stream interface 2 synchronizes it with the internal clock signal and sends the data signal (DATA') to the A/V separator 3. The A/V separator 3 separates the data signal DATA' into two types of code data—audio code data and video code data—and outputs them to the memory interface 4 as two data signals, one as A_DATA and the other as V_DATA. The memory interface 4 stores in memory the audio code data (A_DATA) and the video code data (V_DATA). The audio decoder 5 sets the data request signals A_REQ high, and the video decoder 6 sets the data signal V_REQ high, as necessary (When these decoders do not request data, A_REQ and V_REQ remain low). When A_REQ goes high, the memory interface 4 outputs the audio code data to the audio decoder 5 via the data signal line A_DATA'; when V_REQ goes high, the memory interface 4 outputs the video code data to the video decoder 6 via the data signal line V_DATA'.

When the user data detector 7 detects user data in the data signal V_DATA' that is output from the A/V separator 3 to the video decoder 6, it stores the user data start byte address into the user data start address register 8 and sets the user data detection signal UD_DET high (When the user data is not detected, UD_DET remains low.)

The CPU 9 reads data stored in the memory interface 4 via a register whose address is different from that of the user data start address register 8. When the CPU 9 reads data from the MPEG decoder 1, it sets the read request signal REG_READ low and specifies an address via the address signal REG_ADD. This allows data stored in each register to be read via the data signal line OUT_DATA (When the CPU 9 does not read data, REG_READ remains high.) When the user data detection flag UD_DET is high, the CPU 9 reads the address from the user data start address register 8 and extracts user data, beginning with the memory address specified by the user data start address register 8, until the next start code is detected.

Figure 3:
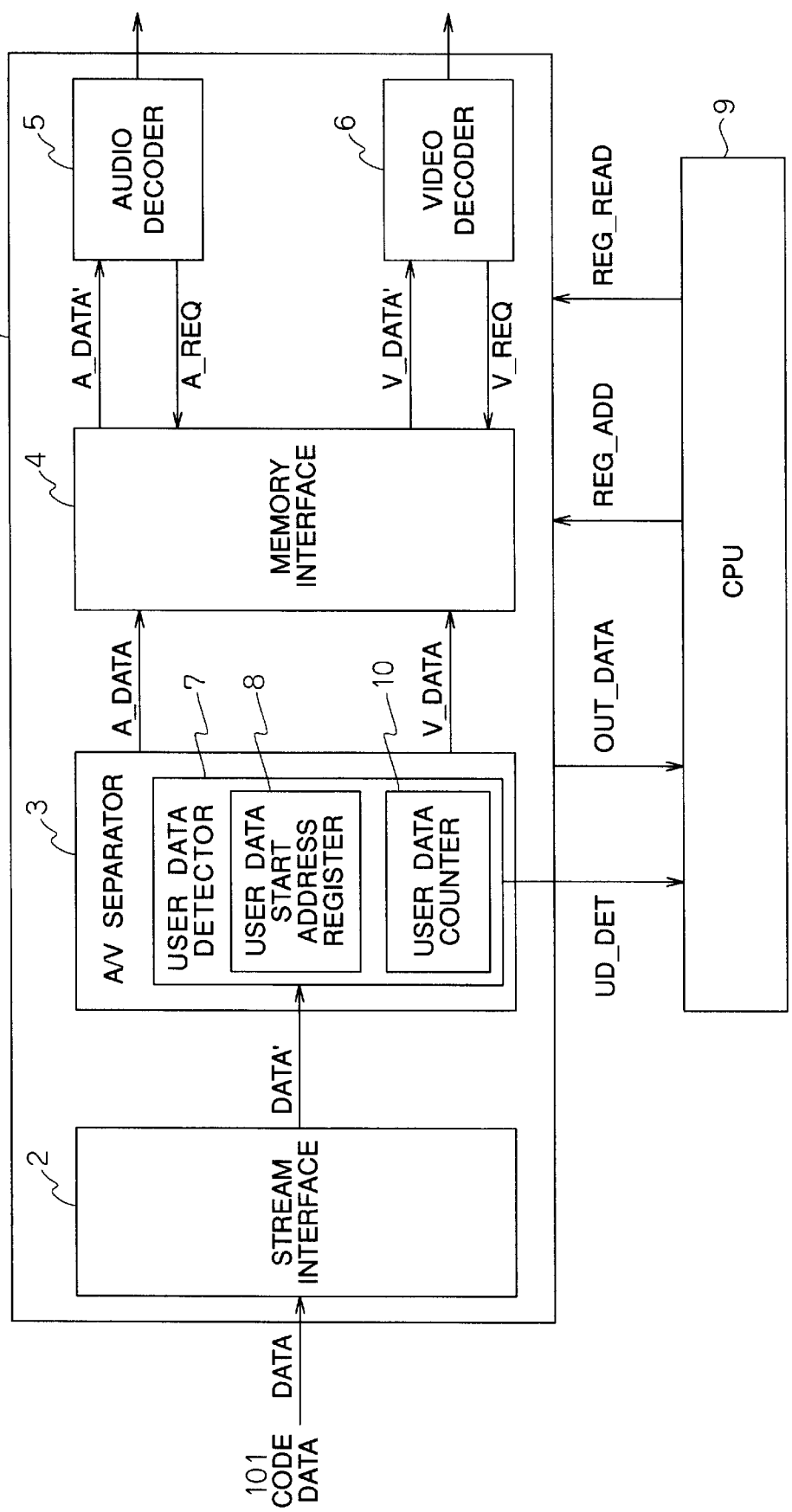
FIG. 3 is a block diagram showing the configuration of the second embodiment of the MPEG decoder of the present invention.
Figure 4:
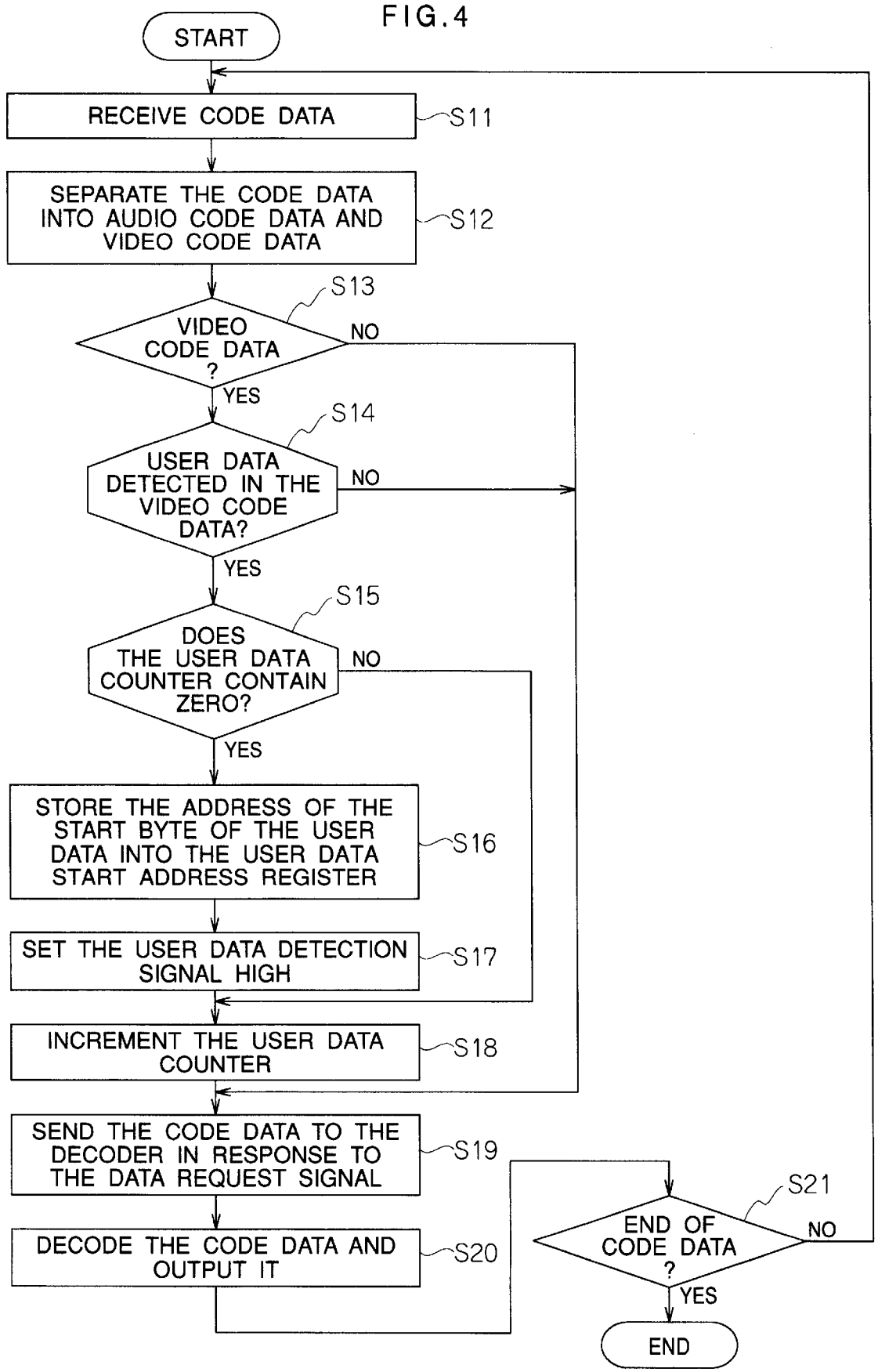
FIG. 4 is a flowchart showing the second embodiment of the MPEG decoder according to the present invention.

Next, the second embodiment of the present invention will be described with reference to FIGS. 3 and 4. An MPEG decoder 18 of the second embodiment differs from that of the first embodiment in that the user data detector 7 has a user data counter 10. The following describes how the MPEG decoder 18 differs in operation from that of the first embodiment.

The A/V separator 3 causes the user data detector 7 to detect user data included in the data signal V_DATA' that is output to the video decoder 6. Upon detecting user data, the user data detector 7 stores into the user data start address register 8 the address of the start byte of the user data in memory only when the user data counter 10 is 0 and sets the user data detection signal UD_DET high (When user data is not detected, UD_DET remains low). Then, the user data detector 7 increments the user data counter 10. The user data counter 10, a register read by the CPU 9, has an address different from that of the register containing user data in the memory interface 4 or from that of the user data start address register 8. When the user data detection flag UD_DET is high, the CPU 9 reads the user data start address register 8 and the user data counter 10. When read by the CPU 9, the user data counter 10 is cleared to 0. The CPU 9 searches the memory interface 4 for user data and extracts it for the number of times specified by the user data counter 10, beginning at the memory address specified by the user data start address register 8.

In the second embodiment, the CPU 9 is able to extract all user data even when a plurality of user data pieces are detected before the CPU 9 starts reading user data.

Figure 5:
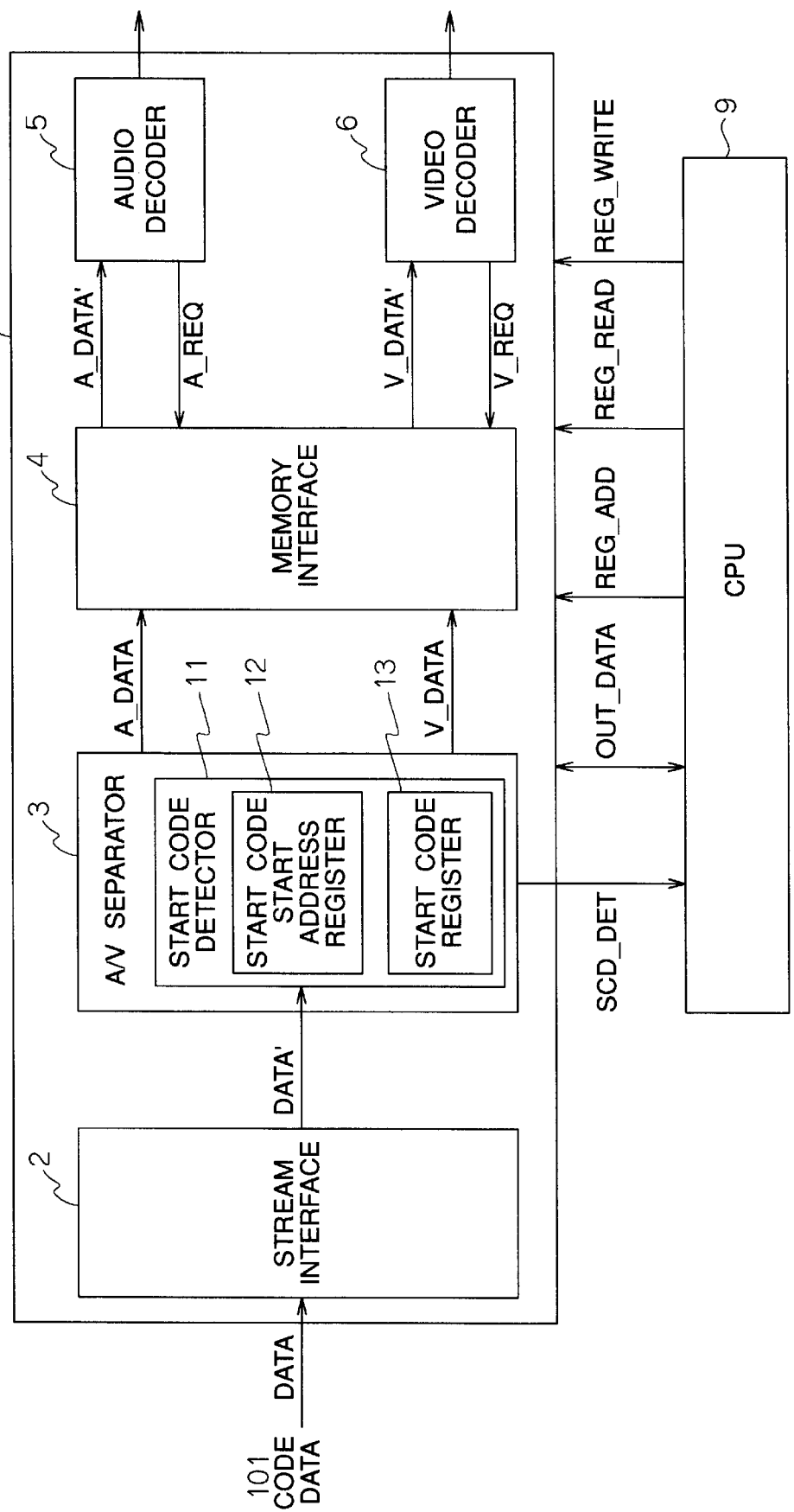
FIG. 5 is a block diagram showing the configuration of the third embodiment of the MPEG decoder of the present invention.
Figure 6:
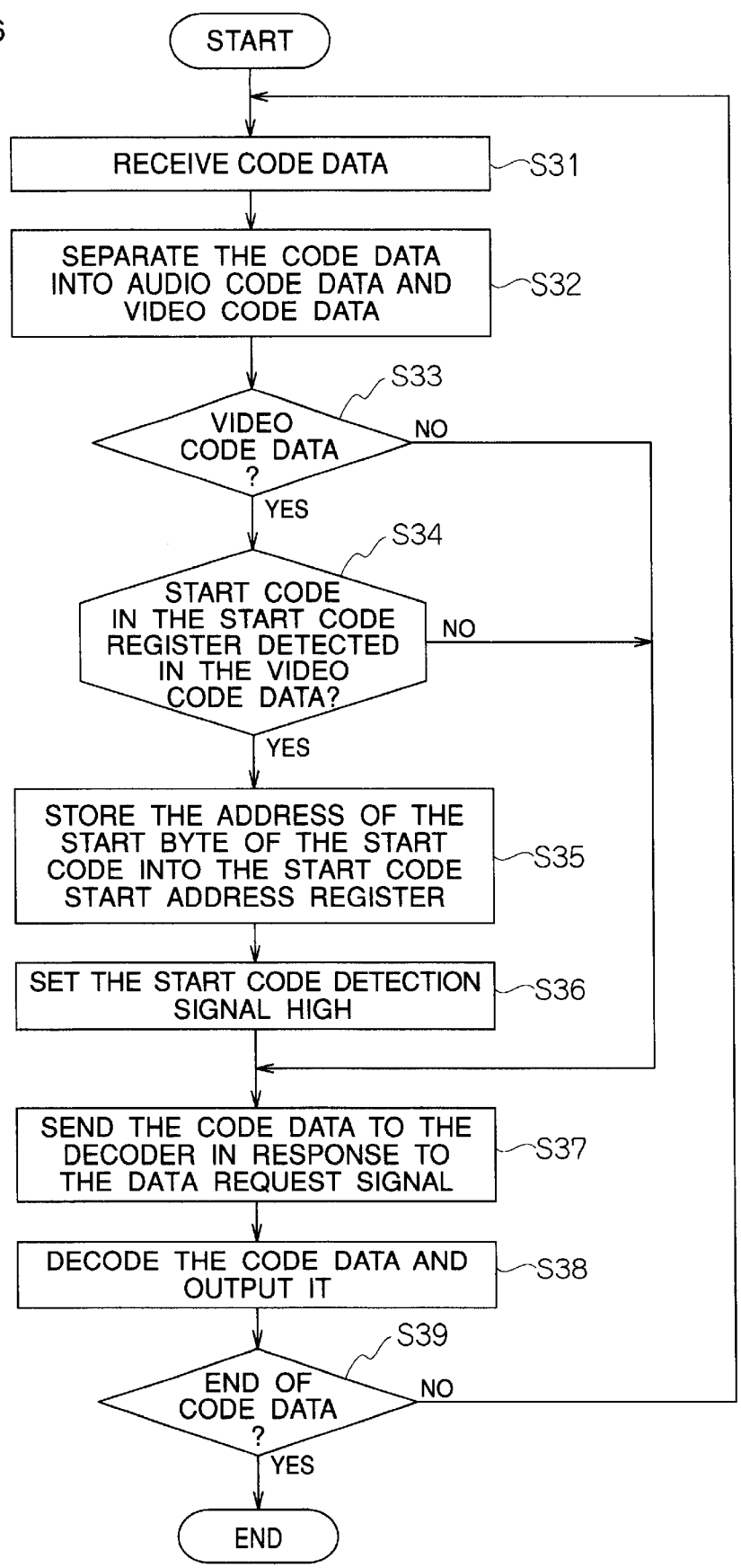
FIG. 6 is a flowchart showing the third embodiment of the MPEG decoder according to the present invention.

Next, the third embodiment of the present invention will be described with reference to FIGS. 5 and 6. An MPEG decoder 19 differs from the MPEG decoder 17 of the first embodiment in the following points. That is, the A/V separator 3 has a start code detector 11 which, in turn, has a start code start address register 12 and a start code register 13. The start code detector 11 outputs the start code detection signal SCD_DET to the CPU 9, the CPU 9 outputs the write request signal REG_WRITE to the MPEG decoder 19, and the OUT_DATA signal is used as the input/output signal. The following describes how the MPEG decoder 19 differs in operation from the MPEG decoder 17 of the first embodiment.

As described below, the CPU 9 reads an address from the start code start address register 12, while the CPU 9 writes a start code into the start code register 13. The register in the memory interface 4, the user data start address register 12, and the start code register 13 each have unique register addresses. The CPU 9 specifies the address of the start code register 13 via the address signal REG_ADD, outputs a user data start code via the data signal OUT_DATA to write it into the start code register 13, and then sets the write request signal REG_WRITE low. The A/V separator 3 uses the start code detector 11 to search the data signal V_DATA', which is sent to the video decoder 6, for the start code stored in the start code register 13. Upon detecting the start code, the start code detector 11 stores the address of the start byte of the start code into the start code start address register 12 and sets the start code detection signal SCD_DET high (When the start code is not detected, the SCD_DET remains low.) When the start code detection flag SCD_DET is high, the CPU 9 reads the start code start address register 12 and reads and extracts user data from the address specified by the start code start address register 12 to the address at which the next start code is detected.

In the third embodiment, the start code of non-user data may be specified in the start code register 13. Then, code data having the specified start code may also be extracted.

Figure 7:
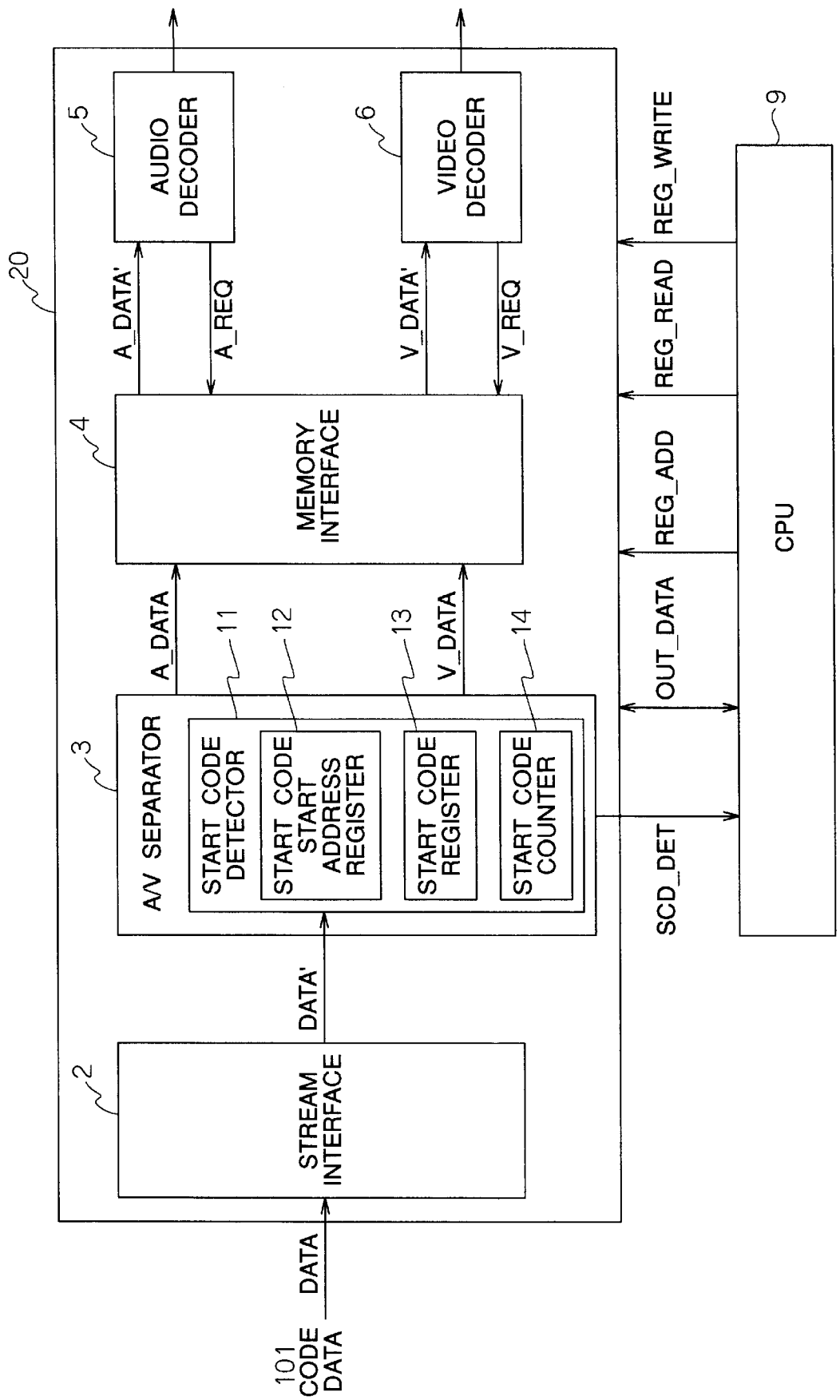
FIG. 7 is a block diagram showing the configuration of the fourth embodiment of the MPEG decoder of the present invention.
Figure 8:
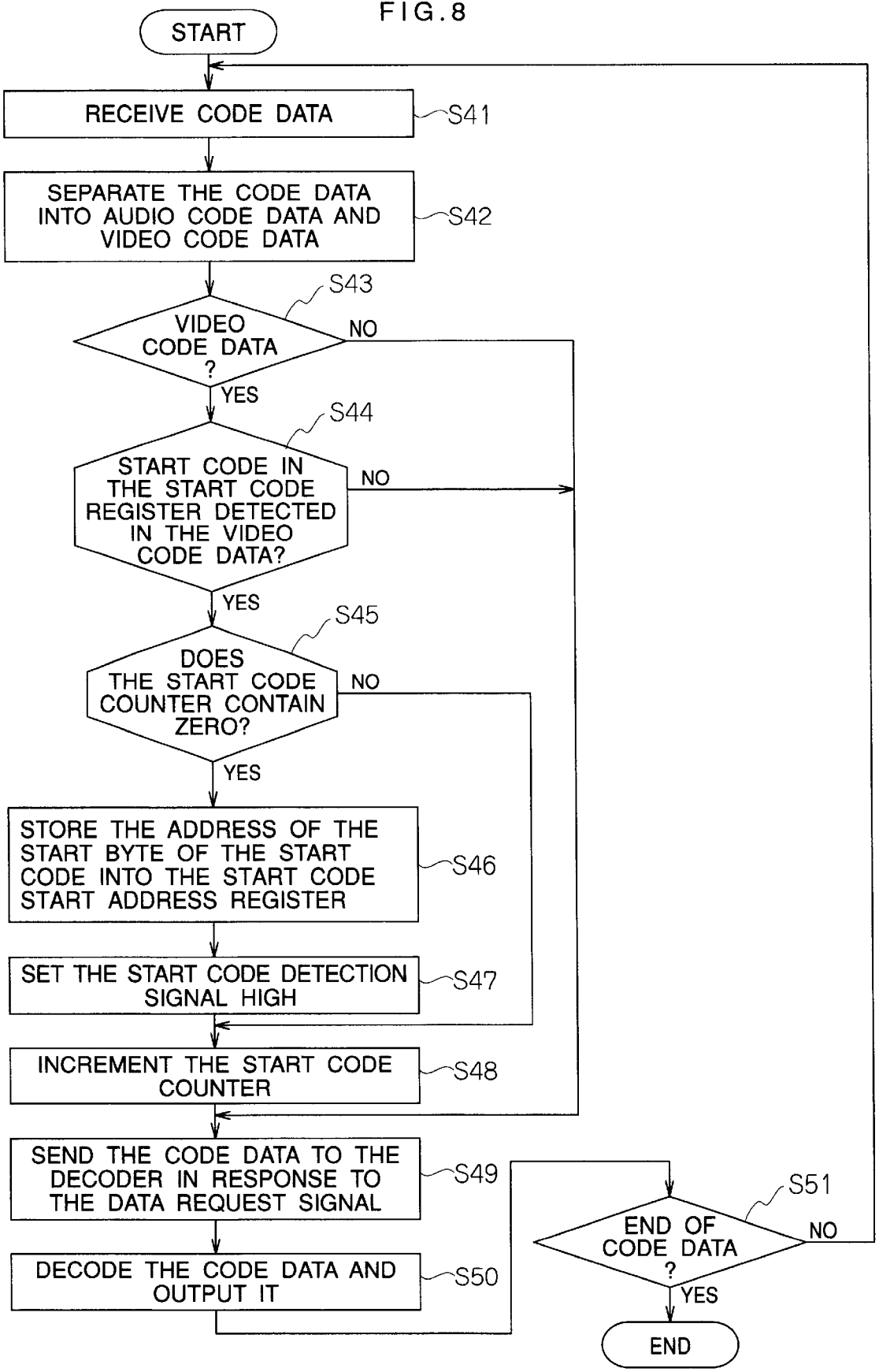
FIG. 8 is a flowchart showing the fourth embodiment of the MPEG decoder according to the present invention.

Next, the fourth embodiment of the present invention will be described with reference to FIGS. 7 and 8. An MPEG decoder 20 differs from the MPEG decoder 19 of the third embodiment in that the start code detector 11 has a start code counter 14. The following describes how the MPEG decoder 20 differs in operation from the MPEG decoder 19 of the third embodiment.

The start code detector 11 searches the data code signal V_DATA', sent from the A/V separator 3 to the video decoder 6, for the start code stored in the start code register 13. Upon detecting the start code, the start code detector 11 stores the address of the start byte of the start code into the start code start address register 12 and sets the start code detection signal SCD_DET high only when the start code counter 14 is 0 (When the start code is not yet detected, SCD_DET remains low.) Then, the start code detector 11 increments the start code counter 14. The start code counter 14, which is a register read by the CPU 9, has an address different from that of the register in the memory interface 4 and from that of the start code start address register 12. When the start code detection flag SCD_DET is high, the CPU 9 reads the address from the start code start address register 12 and the count from the start code counter 14. When read by the CPU 9, the start code counter 14 is cleared to 0. The CPU 9 searches the memory interface 4 for the start code specified by the start code counter 14 and extracts user data, beginning at the memory address specified by the start code start address register 12 for the number of times specified by the start code counter 14.

In the fourth embodiment, even when a plurality of start codes are found before the CPU 9 starts reading the start code, all the start codes may be extracted. It is also possible to specify a non-user data start code in the start code register 13 to extract other start codes from video code.

The invention may be embodied in other specific forms without departing from the spirit or essential characteristic thereof. The present embodiments is therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 9-307289 (Filed on Nov. 11, 1997) including specification, claims, drawings and summary are incorporated herein by reference in its entirety.

What is claimed is:

1. A decoding method for decoding code data comprising audio code data, video code data and data to be discarded during video decoding in an audio/video decoder, said video code data containing start codes indicating said data to be discarded within said video code data, said decoding method comprising:

receiving said code data;

separating the audio code data from the video code data in an audio/video separator;

outputting the audio code data and the video code data from the audio/video separator to a memory for storage;

detecting in said audio/video separator said start codes indicating said data to be discarded;

storing in a start address register of the audio/video separator a start address within the memory of said data to be discarded, said start address determined by said start codes;

turning on a signal in accordance with contents of the audio/video separator start address register and before decoding of said video code data, said signal indicating of the presence of the data to be discarded in said video code data;

reading, using a CPU responsive to said signal, said start address from said start address register;

reading, using said CPU responsive to said signal, said data to be discarded beginning at said start address;

transferring said audio code data and video code data stored in said memory to respective audio and video decoders, said video code data including said data to be discarded;

decoding the transferred audio code data and video code data stored in the memory in said respective audio and video decoders; and skipping over, in said video decoder, said data to be discarded contained in said transferred video code data.

2. The decoding method according to claim 1, further comprising counting pieces of data to be discarded during decoding.

3. The decoding method according to claim 1, wherein a start code indicating said data to be discarded is detected if a code externally specified matches a start code contained in said video code data.

4. The decoding method according to claim 3, further comprising counting pieces of data to be discarded during decoding.

5. The decoding method according to claim 1, wherein said code data is audio/video code data that conforms to MPEG (Moving Pictures Expert Group) standard.

6. The decoding method according to claim 1, wherein said start code conforms to the MPEG standard.

7. The method claimed in claim 1, further comprising:
receiving said signal in said CPU; and
accessing data in said memory at said stored start address by said CPU.

8. A decoding method for decoding MPEG code data in an audio/video decoder, said MPEG code data being composed of audio code data and video code data, said video code data being composed of hierarchical data and user data, the user data being preceded by a user data start code, said decoding method comprising:

receiving the MPEG code data;

separating the MPEG code data into audio code data and video code data in an audio/video separator;

outputting the audio code data and the video code data from the audio/video separator to a memory interface for storage;

detecting in said audio/video separator user data associated with a user data start code;

storing in a start address register of the audio/video separator an address of a start byte of the detected user data;

turning on a signal in accordance with contents of the audio/video separator start address register and before decoding of said video code data, said signal indicating the presence of user data in said video code data;

reading, using a CPU responsive to said signal, said start address from said start address register;

reading, using said CPU responsive to said signal, said user data beginning at said start address;

transferring said audio code data and video code data stored in memory to respective audio and video decoders, said video code data including said user data;

decoding the transferred audio code data and video code data in the respective audio and video decoders; and skipping over, in said video decoder, said user data contained in said transferred video code data.

9. The decoding method according to claim 8, wherein a user data counter is provided in the audio/video separator to count a number of pieces of detected user data, and wherein said method further comprises, if the user data counter is 0, incrementing the user data counter.

10. The method claimed in claim 8, further comprising:
receiving said signal in said CPU; and
accessing data in said memory interface at said stored start address by said CPU.

11. An MPEG decoder decoding MPEG data comprising audio code data and video code data, said decoder comprising a stream interface receiving the MPEG data and sending the MPEG data in synchronization with an internal clock signal; an audio/video separator separating the MPEG data into the audio code data and the video code data; a memory interface storing the audio code data and the video code data; an audio decoder decoding the audio code data and outputting decoded audio data; a video decoder decoding the video code data and outputting decoded video data; and a processor, said processor causing said MPEG decoder to perform processing comprising:

receiving the MPEG code data;

separating the MPEG code data into audio code data and video code data in said audio/video separator;

outputting the audio code data and the video code data from the audio/video separator to said memory interface for storage;

detecting in said audio/video separator user data associated with a user data start code within said video code data;

storing in a start address register of the audio/video separator an address of a start byte of the detected user data;

turning on a signal, in accordance with contents of the audio/video separator start address register and before decoding of said video code data, said signal indicating the presence of user data in said video code data;

directly reading, using a CPU responsive to said signal, said start address from said start address register;

reading, using said CPU responsive to said signal, said user data beginning at said start address;

transferring said audio code data and video code data stored in memory to respective audio and video decoders, said video code data including said user data; and decoding the transferred audio code data and video code data in the respective audio and video decoders skipping over, in said video decoder, said user data contained in said transferred video code data.

12. The MPEG decoder according to claim 11, wherein a user data counter is provided in the audio/video separator to count a number of pieces of detected user data, and wherein said processing further comprises, if the user data counter is 0, incrementing the user data counter.

13. The MPEG decoder claimed in claim 11, said processing further comprising:

receiving said signal in said CPU; and accessing data in said memory interface at said stored start address by said CPU.

14. An MPEG decoder for decoding MPEG data comprising audio data, video data and user data, said decoder comprising:

an audio/video separator for separating said audio data from said video and user data;

a memory interface for storing the separated audio data and video and user data outputted by the audio/video separator;

an audio decoder for decoding the audio data stored in the memory interface; and a video decoder for decoding the video data stored in the memory interface, wherein said audio/video separator comprises a start address register read by a CPU for storing a start address within the memory interface of detected user data, and wherein said audio/video separator produces a signal in accordance with contents of the audio/video separator start register and before decoding of said video code data indicating the presence of user data is stored in the start address register, wherein said start address register includes a start address, said start address being read by said CPU in response to said signal, and wherein said video decoder skips over said user data contained in said video data.

15. The MPEG decoder according to claim 14, wherein said audio/video separator further comprises a counter for counting detected user data.

16. The MPEG decoder according to claim 14, wherein said audio/video separator further comprises a start code detector for detecting a user data start code.

17. The MPEG decoder according to claim 16, wherein said start code detector comprises a start code register for storing a user data start code to be detected.

18. The MPEG decoder according to claim 16, wherein said start code detector comprises a start code register for storing a user data start code to be detected and a counter for counting detected user data.

* * * * *